United States Patent [19]

Costa et al.

[11] Patent Number: 5,247,673
[45] Date of Patent: Sep. 21, 1993

[54] MULTIPROCESSOR SYSTEM HAVING DISTRIBUTED SHARED RESOURCES AND DYNAMIC GLOBAL DATA REPLICATION

[75] Inventors: Maria Costa, Buccinasco; Carlo Leonardi, Legnano, both of Italy

[73] Assignee: Bull HN Information Systems Italia S.p.A., Italy

[21] Appl. No.: 614,804

[22] Filed: Nov. 16, 1990

[30] Foreign Application Priority Data

Dec. 4, 1989 [IT] Italy ................................. 22593 A/89

[51] Int. Cl.$^5$ .................................................... G06F 15/16
[52] U.S. Cl. ................................. 395/650; 364/DIG. 2; 364/974.7; 364/964.27; 364/946.6; 364/971.0; 364/DIG. 1; 364/228.1; 364/282.4; 364/254.3
[58] Field of Search ......................................... 395/650

[56] References Cited

U.S. PATENT DOCUMENTS 4,620,276 10/1986 Daniell et al. ...................... 364/200
4,928,224 5/1990 Zulian ................................. 364/200

OTHER PUBLICATIONS

EP-A-081 056 (IBM) Abstract; p. 4, paragraph 2; claims 1-2.
Cern Conference Proceedings, Geneva, Oct. 7-8, 1985, pp. 283-290; J. Zalewsk, "An approach to programming multimicroprocessor bus systems", p. 285, Section 3, p. 286, Section 4.
GB-A-2 206 714 (Singer) Abstract; FIG. 1, Claims 1-4; p. 5, paragraph 1-p. 6, paragraph 2.
AFIPS Conference Proceedings, Anaheim, Calif. May 16-19, 1983, pp. 557-564; S. L. Lillevik, et al., "A multiprocessor with replicated shared memory", FIG. 15, p. 560, paragraph 2, line 20.

*Primary Examiner*—Gareth D. Shaw
*Assistant Examiner*—A. Katbab
*Attorney, Agent, or Firm*—Faith F. Driscoll; John S. Solakian

[57] ABSTRACT

A multiprocessor system has distributed shared resources and dynamic global data replication in which a plurality of processors communicate each with the other through a system bus. Each CPU is provided with a local memory for storing data used locally and global data shareable by a plurality of processes operative in different CPUs and therefore replicated in the local memory of each CPU. Global data replication is performed at page level only when a global data page is effectively needed by a plurality of processes operative in different CPUs so that memory space required for replication is minimized as well as traffic on the system bus for global data replication and global data writes required for ensuring global data consistency.

7 Claims, 7 Drawing Sheets

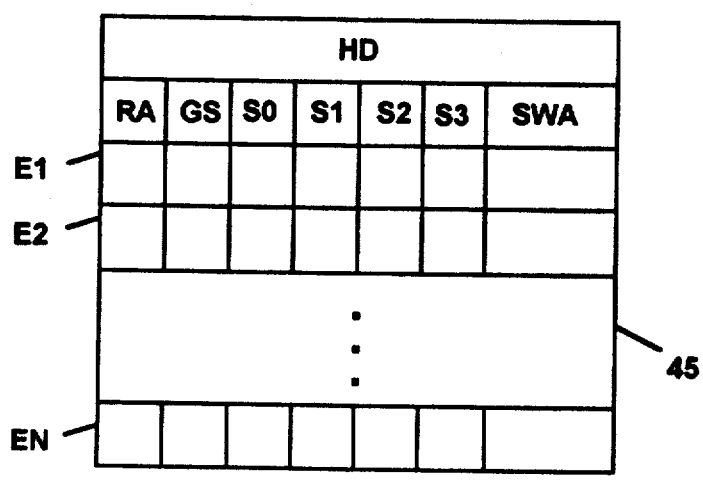

MULTIPROCESSOR SYSTEM HAVING DISTRIBUTED SHARED RESOURCES AND DYNAMIC GLOBAL DATA REPLICATION

RELATED PATENT APPLICATIONS

The following applications are related to the extent they deal with global data replication:

1. "Multiprocessor System Featuring Global Data Multiplation," invented by Ferruccio Zulian, U.S. Pat. No. 4,928,224, issued on May 22, 1990 and assigned to the same assignee as named herein. This application discloses a multiprocessor system architecture where a write operation command related to global data is broadcasted to all the processor through a system bus. The write command contains a destination code which specifies the command as related to global data and is performed by all processors.

2. "Multiprocessor System with Global Data Replication and Two Levels of Address Translation Units," invented by Angelo Casamatta, Calogero Mantellina and Daniele Zanzottera, Ser. No. 07/469,870, filed on Jan. 24, 1990 and assigned to the same assignee as named herein. This application discloses a multiprocessor system architecture where global data are replicated in the local memory of each of the processors and freedom in physical memory allocation of the same global data, in the differing local memories is achieved by using an address common to all the processors (real address) for referencing with a global data write command on a system bus, a memory location where to store (write) a global data, this common address being locally converted by a translation memory, in each of the system processors, to a physical address, which is locally used to reference a local memory location where to write a copy of the global data.

3. "Multiprocessor Systems Having Distributed Shared Resources and Deadlock Prevention," invented by Carlo Bagnoli, Guido Perrella and Tommaso Majo, U.S. Pat. No. 5,182,808, issued on Jan. 26, 1993 and assigned to the same assignee as named herein. This application discloses a multiprocessor system where global data are replicated in the local memory of each of the processors. In order to avoid the deadlock resulting from access to the system bus by one of the processors and referencing a resource of another processor, while the other processor is also seeking access to the system bus, each processor is coupled to the system bus through two interface units, an output interface unit and an input interface unit, and the local resources of each processors are decoupled from each other so that a local memory may be accessed from the system bus through the input interface unit, while the output interface unit is seeking access to the system bus.

4. "Multiprocessor System Having Global Data Replication," invented by Carlo Bagnoli, Angelo Casamatta and Angelo Lazzari, U.S. Pat. No. 5,214,776, issued on May 25, 1993 to the same assignee as named herein. This application discloses a multiprocessor system where global data replication is performed by diverting a local write command, related to global data originated in a processor, to another processor, through a system bus, which processor becomes a destination processor for the write command and the replier in an interlocked protocol dialogue requiring a requesting unit and a replying unit.

BACKGROUND OF THE INVENTION

1. Field of Use

The present invention relates to a multiprocessor system having distributed shared resources and dynamic global data replication. It also relates to the related method for dynamic allocation of global data.

2. Prior Art

Modern data processing systems which may perform several processes at the same time are defined multiprocessing systems. While a program may be defined as a sequence of ordered instructions which perform on a set of data, a process is defined as "an address space, a thread of control operating within that address space and the set of required system resources."

The execution of a program requires the creation of one or more processes, that is, the set up, in terms of addressable space, and the organization of the required resources and their operation. The data needed for program execution and on which the program operates must be loaded into the process space. A physical working memory space must necessarily correspond to the process space as a material support for the data.

In a multiprogramming system (or even simply in a multiprocessing system), the joint generation of a plurality of processes is implied. Then it may happen that some of the data used in different processes, in case at subsequent times, are the same for more processes. These data are defined as "shared data."

The problem has therefore arisen of avoiding loading the same data used in more processes, simultaneously or subsequently active, in an address space, hence in a physical memory space, differing for each process, with the need to replicate the same information for each process or to move it from one space to another, depending on the process. Therefore, the concept of shared memory, typical of the UNIX* operating system, has arose, as memory space intended for storing shared data. The several processes which must operate on shared data, get the shared data from this shared memory.

* Registered Trademark of AT&T.

In the modern data processing systems, in order to obtain higher performance, a plurality of processors are jointly used which may jointly and simultaneously execute a plurality of processes. The processors are interconnected by a system bus through which they communicate among themselves and with common shared resources, such as input/output units and working memories.

To overcome the performance limitations imposed by the system bus and to reduce competition in gaining access to the system bus, local memories are also used. A local memory is related to a processor and may be accessed by the related processor without the need to obtain access to the system bus. Local memories are preferably used to store "local data" used only by the related processor in the processes executed by such processor.

As far as "shared data" is concerned, the multiprocessor architecture poses some problem. It is clear that several processors may operate with a plurality of processes on the same shared data.

Therefore, in a multiprocessor system, the concept may be introduced of local data, shared or unshared, as data used in the processes performed in a single processor and global data that is shared data which is used by more processes executed in different processors. The global data may be stored in a single shared memory which may be accessed through the system bus or stored in one or more local memories to which the unrelated processors may have access through the system bus with the previously indicated drawbacks.

To overcome, at least in part, this drawback, the concept of replicated global data has been recently proposed and described in the EP-A-0320607, published Jun. 21, 1989, corresponding to U.S. Pat. No. 4,928,224, issued on May 22, 1990. According to this concept, the global data are stored and replicated in each of the local memories of a multiprocessor system. In this way, each system processor may read the global data in its related local memory without having access to the system bus.

In case where a write operation is performed on global data, access to the system bus is required to write the data in all local memories, thus assuring its consistency everywhere. This drawback is largely balanced by the resulting advantages. A second drawback is that the local memories must be of a size to store the global data. Each of them must therefore have a large capacity which is adequate for storing all the global data which may be required for parallel execution of several processes.

SUMMARY OF THE INVENTION

To contain within economically acceptable limits the capacity of the local memories, it is therefore required to keep the global data and related replication at a minimum. The present invention achieves this result by adopting a criterion of dynamic global data replication and is based on the fact that global data may be considered to be within two broad categories:

Global data which define the status of the system and may be needed at any time by any one of the processors; this is generally data used by the system supervisor; and, Global data of user processes which may be needed in a plurality of user processes, hence needed by several processors jointly in limited time periods during which each of the processors performs one of the processes simultaneously with the other processors; this is data shareable by more processors but actually shared only in particular circumstances.

According to the invention, the global data of the second category, as long as it is used by one processor only, is stored only in the local memory related to the one processor and is qualified as local data so as not to require space in the local memories of the other processors nor replication operations and consequent system bus accesses. It is qualified as global data only when at least a second processor requires its use. In this case, it is replicated in all local memories. It resumes the local data qualification when it is needed by one processor only and not by the others, thus making some space available in the local memory which is related to the other processors.

Managing the dynamic global data in the way previously summarized does not require architectural modifications. What is needed is a set of tables in the local memories The tables store information which describes the status of the memory pages in the several local memories for those pages which are intended for storing shared and potentially global data. These tables are also a set of global data used by the supervisor. Some change to the page fault handling mechanism, that is, to the routine which manages the operations to be performed on the occurrence of the page error signal, is required.

The global data replication in each of the system local memories requires that some space be available in each local memory for replication. If the replication is performed with a global data write command characterized by a physical memory address and generated by one system processor, it is required that the physical memory space reserved to the global data has the same physical addresses. This constraint is overcome with the arrangements and means described in the Italian patent application number 19787A/89, filed Mar. 15, 1989, corresponding to U.S. Ser. No. 469,870, filed on Jan. 24, 1990. Basically, according to the disclosure in such application, the global data read or write operations make use of a memory address which is conventionally designated as real to distinguish it from the physical one. This real address is converted in each local memory into a physical address, generally different in each local memory by means of a plurality of translation memories, each coupled to a local memory. In this way, each processor may control the allocation of global data in its own local memory, in an autonomous way, even if at system level the global data are referenced by a common address, say the real address.

Given that the multiprocessor system of the present invention, as well as those described in the cited patent applications, make use of the virtual memory concept, this results in that each system processor is provided with a first memory management unit or MMU which converts logical or virtual addresses used at SW level, directly into physical addresses in case of local data, and into real addresses in case of global data. Each system processor is further provided with a second address translation unit coupled to its own local memory for converting the real addresses into physical addresses. Each processor manages the allocation of the information in its own local memory with its own memory management system and in an autonomous way.

BRIEF DESCRIPTION OF THE DRAWINGS

The features and the advantages of the invention will be seen more clearly from the following description of a preferred form of embodiment and from the following drawings.

FIG. 5 shows the structure of one of the tables of FIG. 4 which describes the features of a global data segment.

FIGS. 6 through 9 show, by way of example, the contents of the table of FIG. 5 at subsequent times.

DESCRIPTION OF THE PREFERRED EMBODIMENT

Figure 1:
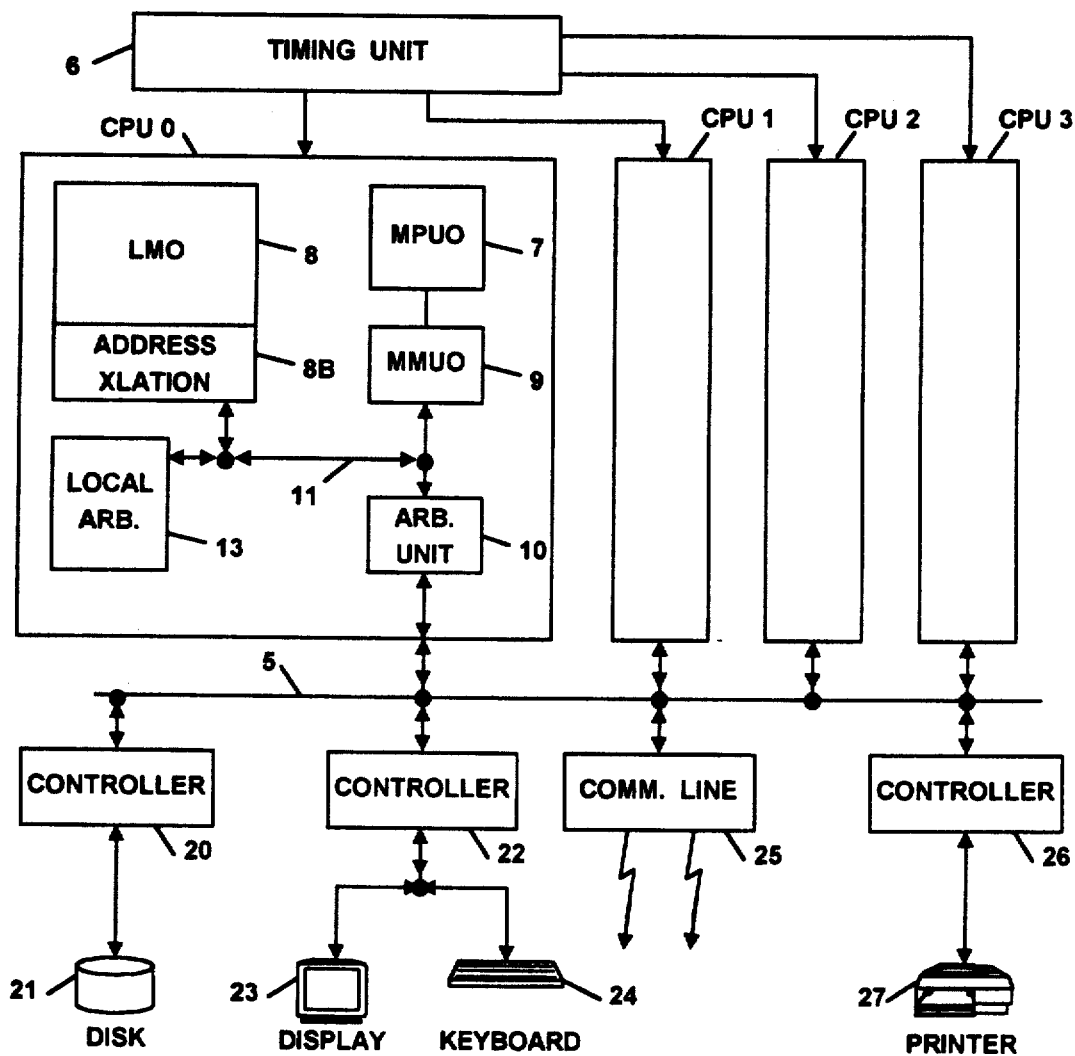
FIG. 1 is a block diagram of a multiprocessor system having shared resources and providing a dynamic replication and management of global data in accordance with the present invention.

FIG. 1 shows, in block diagram, a multiprocessor system capable of global data replication and dynamic and selective management in accordance with the present invention. A multiprocessor system similar to the one shown in FIG. 1 is described in detail in the EP-A-320607 patent application, corresponding to U.S. Pat. No. 4,928,224, issued on May 22, 1990, as well as in the European patent application numbers 89120432.3, filed on Nov. 4, 1989, corresponding to U.S. Ser. No. 424,378, filed on Oct. 20, 1989 and 89120433.1, filed on Nov. 4, 1989, corresponding to U.S. Ser. No. 423,820, filed on Oct. 18, 1989, in addition to the Italian patent application number 19787 A/89, filed on Mar. 15, 1989, corresponding to U.S. Ser. No. 469,870, filed on Jan. 24, 1990, to which reference is made for all information not provided herein.

The system of FIG. 1 comprises four central processing units CPU0, CPU1, CPU2 and CPU3, connected to each other through a system bus 5. Several units are timed by a timing unit 6. CPU0 comprises a microprocessor 7 or MPU0, an address managing unit 9 or MMU0, a local memory 8 or LM0, an interface and arbitration unit 10, a local arbitrator 13 and an address translation unit 8B. The microprocessor 7 communicates with the local memory 8 and with the interface unit 10 by means of a local bus 11.

The microprocessor 7 has access to the system bus through the interface unit 10, for receiving from and forwarding information to the other CPUs, and for referencing the local memory of the other CPUs or peripheral control units connected to the system bus 5, such as a controller 20 for disk unit 21 or secondary memories, a controller 22 for a display 23 and keyboard 24, a communication line controller 25 and a controller 26 for a printer 27. Unit 10 together with corresponding units in the other CPUs arbitrates access to the system bus 5 by several CPUs and manages the communication protocol on the system bus 5. The other CPUs of the system may obtain access through the interface unit 10 to the local bus 11 of CPU0 and from there to the local memory 8.

The address management unit 9, shown in FIG. 1 as an entity separate from processor 7, may be incorporated as an integral part of processor 7. For instance, this is the case if processor 7 consists of an integrated microprocessor chip designated MC68030, manufactured by Motorola Corporation. In addition to the address management unit 9 (MMU0), CPU0 comprises an address translation unit 8B coupled to the local memory 8. The addressing of local memory 8 is performed by physical addresses received through the local bus 11 either from the address management unit 9 or from the interface and arbitration unit 10. In case where a real address is put on the local bus (hence a global data address), this address is detected as a global data address and is converted into a physical address by the translation unit 8B coupled to the local memory 8. The other CPUs of the system have an architecture identical to the one of CPU0.

Figure 2:
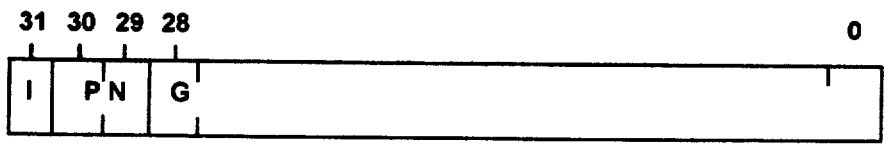
FIG. 2 shows the format of the addresses generated by the memory management units (MMU) in the system of FIG. 1.

In the system of FIG. 1, the addresses in output from the MMUs of the several CPUs, have the format shown in FIG. 2. Intentionally, such addresses are not referenced as physical addresses because they may either be effective physical addresses or real addresses, which require a further conversion into physical addresses. A physical or real address output from the MMU of any one of the CPUs comprises 32 bits (bits 0–31). The more significant bits, referenced respectively as I (Internal Space, bit 31), PN (for Processor Number, bit 29, 30) and G (for Global, bit 28) define the nature of the space addressed by bits 0–27. Bit 31, depending on its level true or false, conceptually distinguishes between two spaces; an internal space (bit 31=1) and an external space (bit 31=0). Within the external space (bit 31=0), bits 29 and 30 identify, depending on their level, the memory space (that is the local memory) of one of the several CPUs 0, 1, 2 and 3. Within the local memory space, bit 28 when asserted (i.e., =1) indicates that the referenced space is a "global space" for storing global data; bit 28 when not asserted (i.e., =0) indicates that the referenced space is a local space for storing local information. Bit 31 when asserted indicates that the addressed space is internal, that is, within the resources of the same CPU where the address is generated.

If bits 29 and 30 are both not asserted and bit 31 is asserted, the selected internal space is the one of the local memory and within this space, bit 28, depending on its level, references a local or global space. If at least one of bits 29 and 30 is asserted, the referenced internal space is generically a "register space" wherein bits 0–28 or some of them are used to reference one among a plurality of resources other than the local memory.

Bit 28, in addition to identifying a global space (bit 28=1) as opposed to a local space (bit 28=0), has another important function When asserted, it indicates that the address to which it pertains is a "real address" and must be converted into a physical address for referencing the several local memories. The conversion operation is performed in an autonomous way by each CPU, through the related translation unit, such as, unit 8B in CPU0.

Bits from 27 to 12 of each address are a physical or real page address, depending on bit 28 being false or true. Bits from 11 to 0 are an "offset" (invariant in the conversion of an address from logical to real and from real to physical one) which references a byte of information within a 4 Kbyte page.

It is clear that by means of this address format, a CPU may reference through the related MMU, an entry of its own local memory (internal space) or an entry of any one of the other local memories (external space) which are seen as distributed and shared memory resources. The selection of an internal memory space may be performed through the local bus without affecting the system bus. The selection of an external space is performed through the local bus and the interface unit of the agent CPU, the system bus, the interface unit and the local bus of the CPU related to the destination local memory.

The previously mentioned patent applications describe in detail the circuits which perform these operations. In case of global data write, the operation is performed jointly in all the local memories so that the global data is replicated in all local memories. The global data addressing both for read and write operations, is performed with the real address which locally, just upstream of each local memory, is converted into a physical address by the address translation unit coupled to each local memory. The management of the local memories which in the whole, form a distributed and shared memory, is performed, as known, by means of a main memory management program or MMMS based on a set of software tables linked in a hierarchical data structure.

Figure 3:
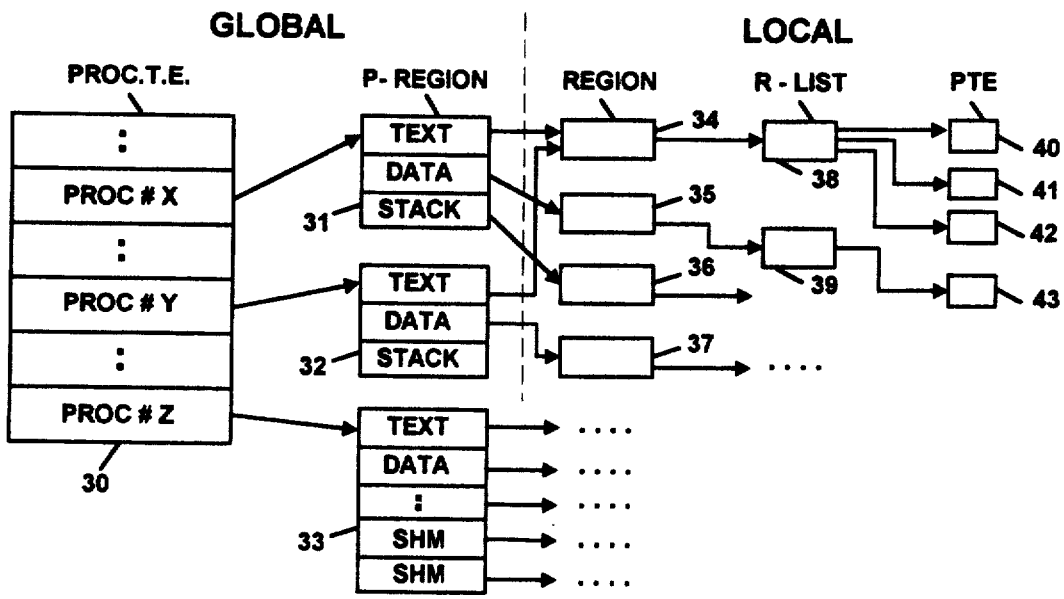
FIG. 3 shows the memory tables which are used by a memory management system of conventional kind in the system of FIG. 1.

FIG. 3 shows such tables and their linking schematically. These tables are obviously stored in memory and in view of the specific context of the invention, for each of them, it is indicated if it is local (LOCAL) or global (GLOBAL) that is replicated in each of the local memories. The memory space needed for storing such tables is allocated by the supervisor system at initialization.

The first table 30 named PROC.T.E is basically a list of processes in FIG. 3 shown as the generical processes PROC#X, PROC#Y and PROC#Z which have been created for execution in the system by means of system primitives which in the case of the UNIX V operating system are FORK and EXEC. Each process referenced by an identifier (Process ID) has a pointer to a data region named P-REGION. The P-REGION contains information related to the virtual address space used by the process (space bases), that is, to the regions of addresses used by the process. In FIG. 3, P-REGIONs 31, 32 and 33 respectively are shown connected to processes #X, #Y and #Z. A first region named TEXT is for storing instructions executed by the process. A second region named DATA is for storing data used and/or created by the process. A third region named STACK is for storing transient information used in the course of process execution. A fourth or more regions (if present) named SHM (shared memory) is/are for storing global data.

For each one of these regions or segments there is a data structure in the table P-REGION. This data structure defines the virtual address base of the segment and a pointer to a further table named REGION. FIG. 3 shows REGION tables 34, 35, 36 and 37. Tables PROC.T.E. and P-REGION contain information which may be used and tested by more processors in different processors. This information is a global data and therefore these tables are replicated in each one of the local memories in a shared memory segment of the "Kernel." This segment is allocated in a predetermined memory space whose physical address coincide with the real address. The REGION table related to each virtual segment of the process, contains information as to the size and nature of the segment and a pointer to a second table or list named R-LIST (i.e., tables 38 and 39 of FIG. 3). The R-LIST defines in terms of "displacement," the virtual addresses of the page sets which form the segment.

Each address refers to a further table PTE (page table entry) (i.e., tables 40, 41, 42 and 43 of FIG. 3). This table contains the physical page address which correspond to each logical address an which is assigned by the MMMS. Other information is further contained, such as the location of the data referenced by the physical/logical address on a disk or swap file as well as the status of the related memory page, such as valid if data are effectively stored in memory or invalid. Tables REGION, R-LIST and PTE have the character of information specific to the process which they describe. Therefore, they are local data stored only in the local memory of the processor where the process is active. As it will be described in the following, the table REGION related to a shared memory segment contains further a pointer to a global data structure which the system uses to coordinate the use of the shared memory segment in the several CPUs. This data structure is an essential feature of the present invention.

The conventional operation of an operating system with the above described data structures related to non shared segments is as follows. When a new process is created in a processor by a FORK system call, the operating system adds in the table PROC.T.E, a new process identifier and related pointer, builds up a new P-REGION for the new process, a new REGION and a new R-LIST for each segment of the process and a new PTE table, where the physical pages are tagged as missing (i.e., invalid). The effective allocation of physical pages to the process, the compilation of the PTE tables with physical page addresses and their validation are performed page by page on demand. The operating system further loads the possible references to a mass storage (disk) and a context register contained in the MMU related to the processor. All the MMU entries are tagged as invalid. In fact, by the previous operations, a certain memory space has been reserved without filling it with valid contents. At this point, the process may be started.

The processor where the MMU has been so preset, controls the reading of a first instruction of the TEXT segment at a first virtual address. This address is received by the MMU. Since an invalid contents corresponds to this entry, the MMU generates an error signal (i.e., Page fault) which calls for supervisor intervention. The supervisor may ascertain the reason of the error signal by means of the context register contents and the already mentioned linked tables. Therefore, it reads the first text page from a secondary storage and loads it in an available physical page of local memory whose physical address is caused to be related to the virtual address of the first text page. The PTE entry corresponding to the virtual page address is loaded with the corresponding physical page address and with a valid page indicator. Then the process may be restarted and proceeds until the generation of a virtual address for which there is no correspondence with a valid physical address. This causes a retriggering of the "page fault handling" mechanism.

It must be noted that the above described operations are performed at local processor level without affecting the system bus except for read operations from secondary storage and global data table write operations. The above described operations occur in the handling of text, data and stack segments.

Figure 4:
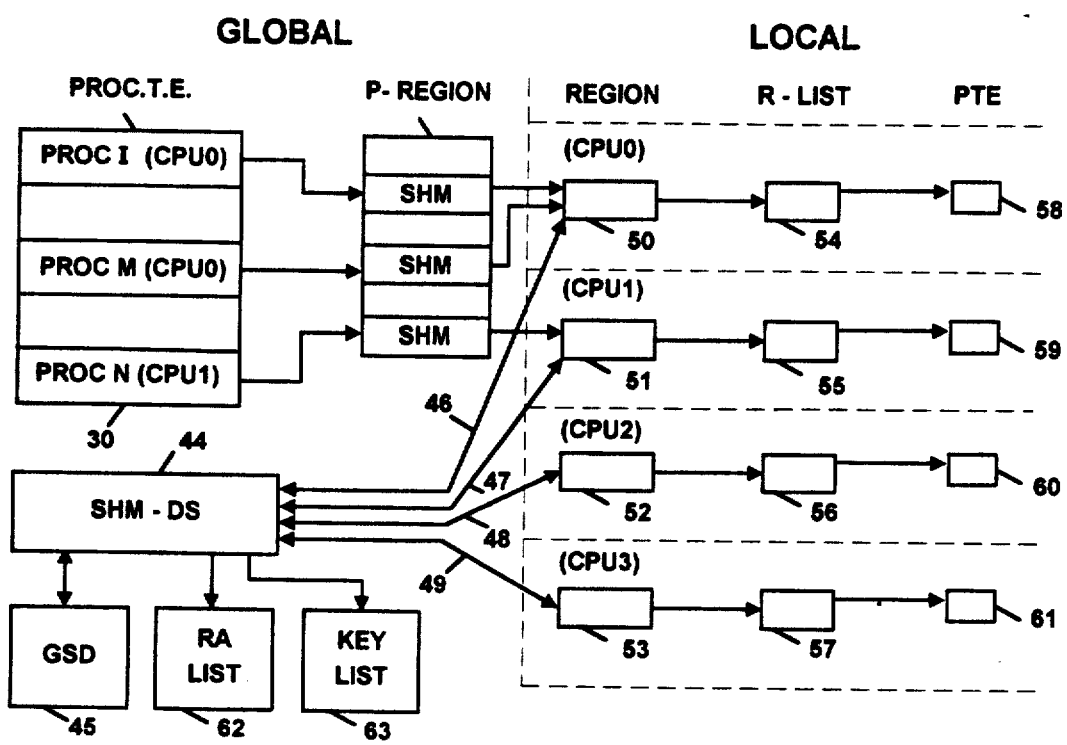
FIG. 4 shows the memory tables which are used according to the present invention for the dynamic replication and management of global data and the data segments to which they pertain.

In the case of the shared memory segment SHM, the system operates in a new and innovative way, according to the present invention. FIG. 4 shows schematically, the tables used in accordance with the invention for managing shared memory segments and the links of such tables. In this case, a plurality of processes listed in table PROC.T.E shown in FIG. 4 as processes PROC#I, PROC#M and PROC#N, may share the same memory segment SHM. To manage this segment, the system uses a new global table comprising a fixed size portion 44 SHM-DS (for Shared Memory-Data Structure) and a variable size portion GSD (for Global Segment Descriptor).

In the SHM-DS table, information is stored related to the features of the memory segment intended for storing shared data. The following information is specifically mentioned:

(a) N pointers 46, 47, 48 and 49 as many as the CPUs in the system (i.e., 4 in the described embodiment). Each pointer references a local table REGION 50, 51, 52 and 53, each table being specific to a CPU. Each REGION table points to a local R-LIST 54 through 57.

(b) Information related to the user who has created the shared segment, the user group to which the user pertains, segment access permissions (i.e., who and in which manner has access to the segment), number of users actively using the segment and segment size.

(c) A code "key-t" which identifies the container function of the segment, say the data which have to be stored in the segment.

Each of the local REGIONs contains the information already considered with reference to the TEXT, DATA and STACK segments. In addition, it contains information as to the number of users which are using the region. The local R-LISTs, related to the SHM segment, are functionally identical to those related to the TEXT, DATA and STACK segments.

The format of the global segment descriptor GSD 45 is shown in FIG. 5 and comprises an identification header HD and one entry E1, E2 or E3, for each logical page address of the segment Each entry contains a page real address RA corresponding to a page logical address, a status bit GS which defines the related page as global or local, a status bit for each CPU, S0, S1, S2 or S3 which defines for each CPU if the page is valid or invalid and a swap area address SWA where in case the information contained in the related page has to be saved. Table GSD points through tables SHM-DS, REGION and R-LIST, as shown in FIG. 4 to four local tables PTE 58, 59, 60 and 61. Each one of tables 58, 59, 60 and 61 is used for storing a physical page address corresponding to each virtual page address.

In addition to these tables, there is also a global table which is simply a list (RALIST 62 in FIG. 4) of real addresses used in association with global segments which have been created and are in existence, as well as a table 63 (KEYLIST) which establishes a relation between each global segment key and global segment identification code or shm-id. The shared memory identifier shm-id enables direct pointing to the structure SHM-DS.

Figure 10:
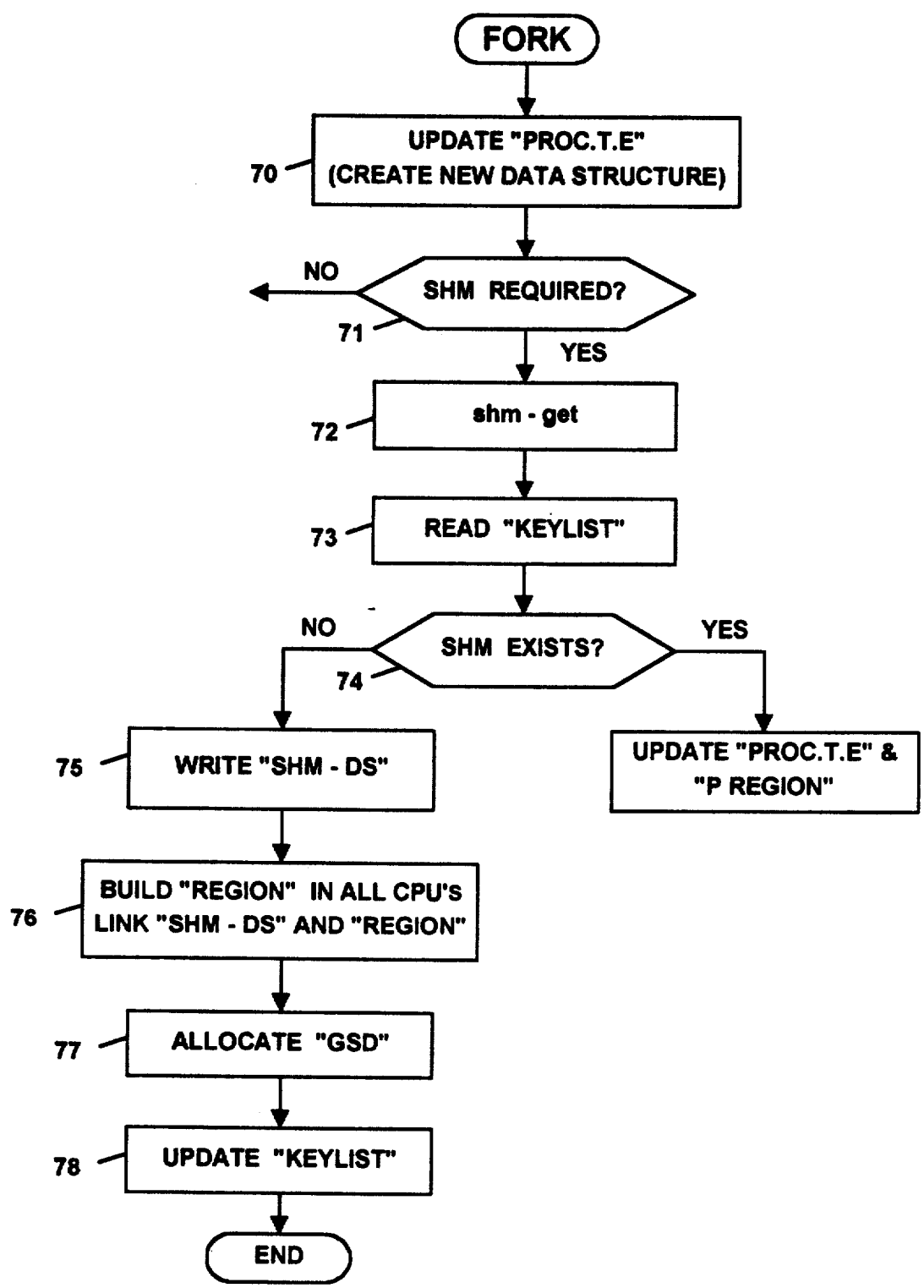
FIG. 10 is a flow diagram showing the generation process of tables describing and managing global data segments.

As depicted in FIG. 10, the operation of the system by means of these data structures is as follows. When a new process is created by a system call and a new data structure is created describing the process, the table PROC.T.E. is updated first (step 70). If the new process requires the use of a shared segment (step 71), a system primitive named shm-get is activated (step 72). This primitive checks if a shared segment having the required features and functionalities is already existing. This check is performed by means of the KEY LIST (steps 73, 74). If the shared segment does not exist, the data structure SHM-DS which is a global table, and is therefore replicated, is built up to describe the new segment (step 75). A local REGION is built up in each CPU to provide a local description of the new segment. The SHM-DS table and the REGION tables are linked each other through points (step 76).

In addition, a table GSD is allocated as a global table and hence replicated in the local memory of each CPU (step 77). Table GDS is provided with the due heading corresponding to the segment key or shm-id. The size of the table is defined as a function of the size of the segment to be described. In this phase, table GSD is empty except for the heading It is initialized or compiled at a subsequent phase.

Figure 11:
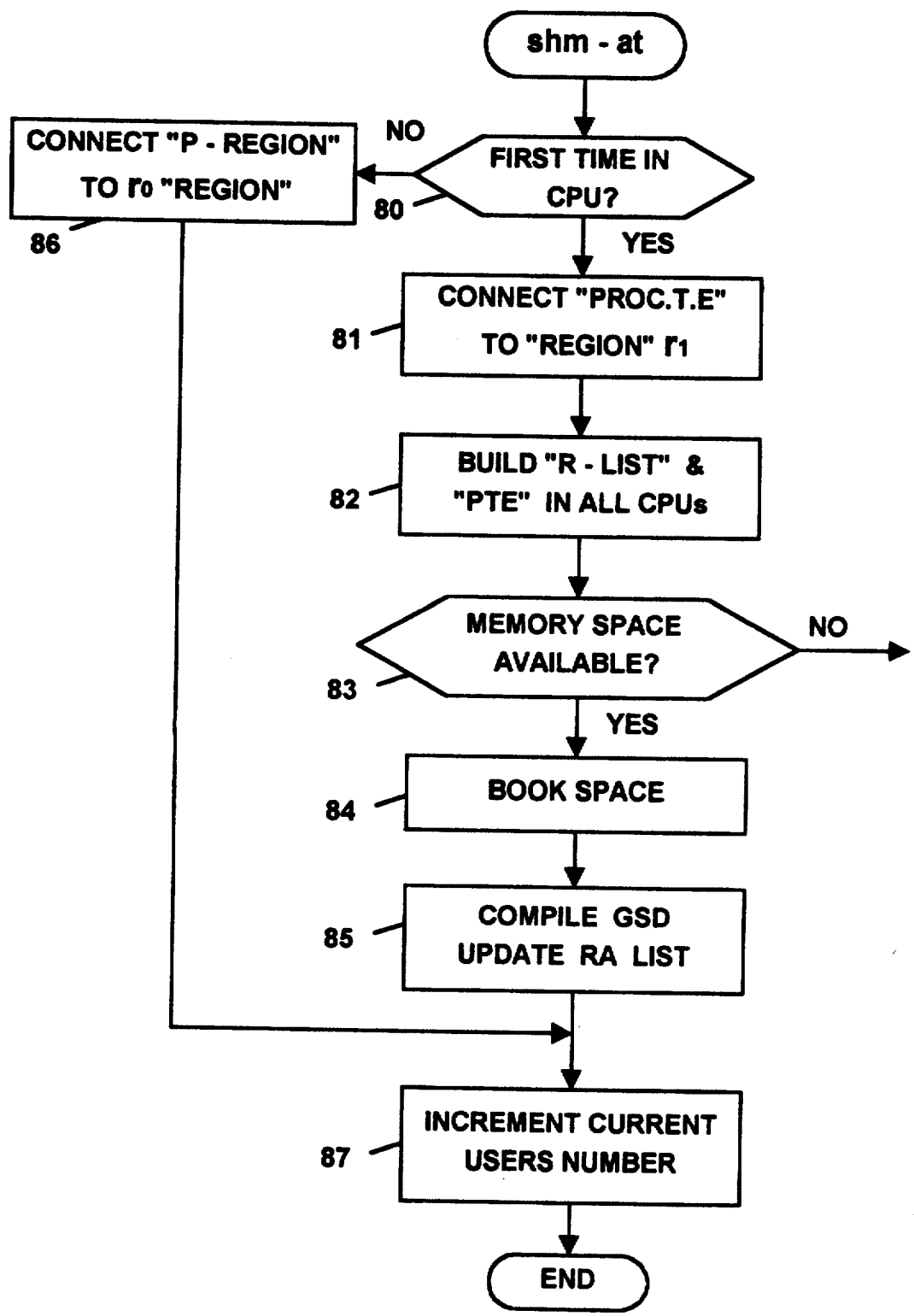
FIG. 11 is a flow diagram showing the connection of a shared segment to a user process.

It must be noted that no memory space is allocated except the one needed by the REGION local tables and by the global tables SHM-DS and GSD. The KEY-LIST is updated with the new pair KEY/shm-id related to the created shared segment. Thus, a new segment is nominally created. The use of such segment is performed by means of a primitive shm-at which invokes the connection of the segment to a user process. As shown in FIG. 11, by means of this primitive, the PROC.T.E entry of the requesting process is connected through the P-REGION and in a conventional way to the REGION which locally describes the shared segment (step 81). This means that if the requesting process I is executed in the CPU0, it will be connected to REGION 50, built up in CPU0, while a requesting process N, executed in the CPU1, will be connected to REGION 51 and built up in CPU1 of FIG. 4.

Both REGION tables 50 and 51 are linked to the same table SHM-DS 44. Further, the first time the primitive shm-at is performed in a CPU for connecting the segment, the tables R-LIST (i.e., 54, 55, 56 and 57 of FIG. 4) and the tables PTE (i.e., 58, 59, 60 and 61 of FIG. 4) are built up in the local memory of all the CPUs (steps 80, 82). In all the CPUs, it is further tested if memory space is available for the physical allocation of the shared segment (step 83). Once verified that the memory space is available, as free space of the working memory and/or as a memory space already containing information which can be swapped, thus freeing the space, this space is booked in terms of required number of pages but not allocated (step 84). Then segment GSD is compiled with a series of real addresses chosen among those which have not been used on the basis of the list RALIST which is updated (step 85). The allocation of physical memory space is made only on demand due to the "page fault" mechanism.

Initially, the tables R.LIST and PTE linked to the REGION tables are loaded with information defining the several physical pages as invalid or missing (i.e., no physical page address is given). Subsequently, as the physical pages are allocated on demand to store information identified by virtual page addresses and related real addresses, the relation between real page address and physical address is established. The physical addresses so assigned are then written in the translation memory 8B for locally converting the real addresses into physical addresses. In table GSD, the pages are all set missing (i.e., bit S0, S1, S2 and S3 invalid) and the status bits GS is meaningless. In the REGION table related to the CPU where the first connection of the shared segment is performed, the field reserved to indicate the number of current users of the shared segment, initially empty, is incremented by one. The same occurs for a field in the SHM-DS structure, which has the same function at system level.

It is reminded here that the shm-at primitive connects a shared segment to a process but does not allocate a physical memory space to the process. Allocation is made on demand by the page fault mechanism, suitably modified Before considering this aspect, it is advisable to consider the case of shared segment generation when the segment is already existing and its connection to another process. If a generic process requests with the shm-get primitive, the creation of a shared segment and this segment already exists (FIG. 10, step 84) is defined by the same KEY and the same SHM-ID, the primitive makes nothing more than supplying the process with information enabling it to perform the connection, that is, to execute the shm-at primitive. If a generic process requests with the shm-at primitive, the connection of an already existing segment, the segment being already connected to another process in the same CPU, the system selects in the structure SHM-DS, the address of the region REGION in the same CPU where the requesting process is operating and connects the P-REGION of the requesting process to this REGION (FIG. 11, steps 86). Then, the REGION field which defines the number of segment current users is incremented by one, as well as the corresponding field of the SHM-DS structure (FIG. 11, step 87). This implies that more processes operating on the same shared segment can use different virtual addresses for reference to the shared segment because the base of the virtual addresses is stored in the P-REGION, there being a P-REGION per process while several different P-REGIONSs point to the same REGION.

Figure 12:
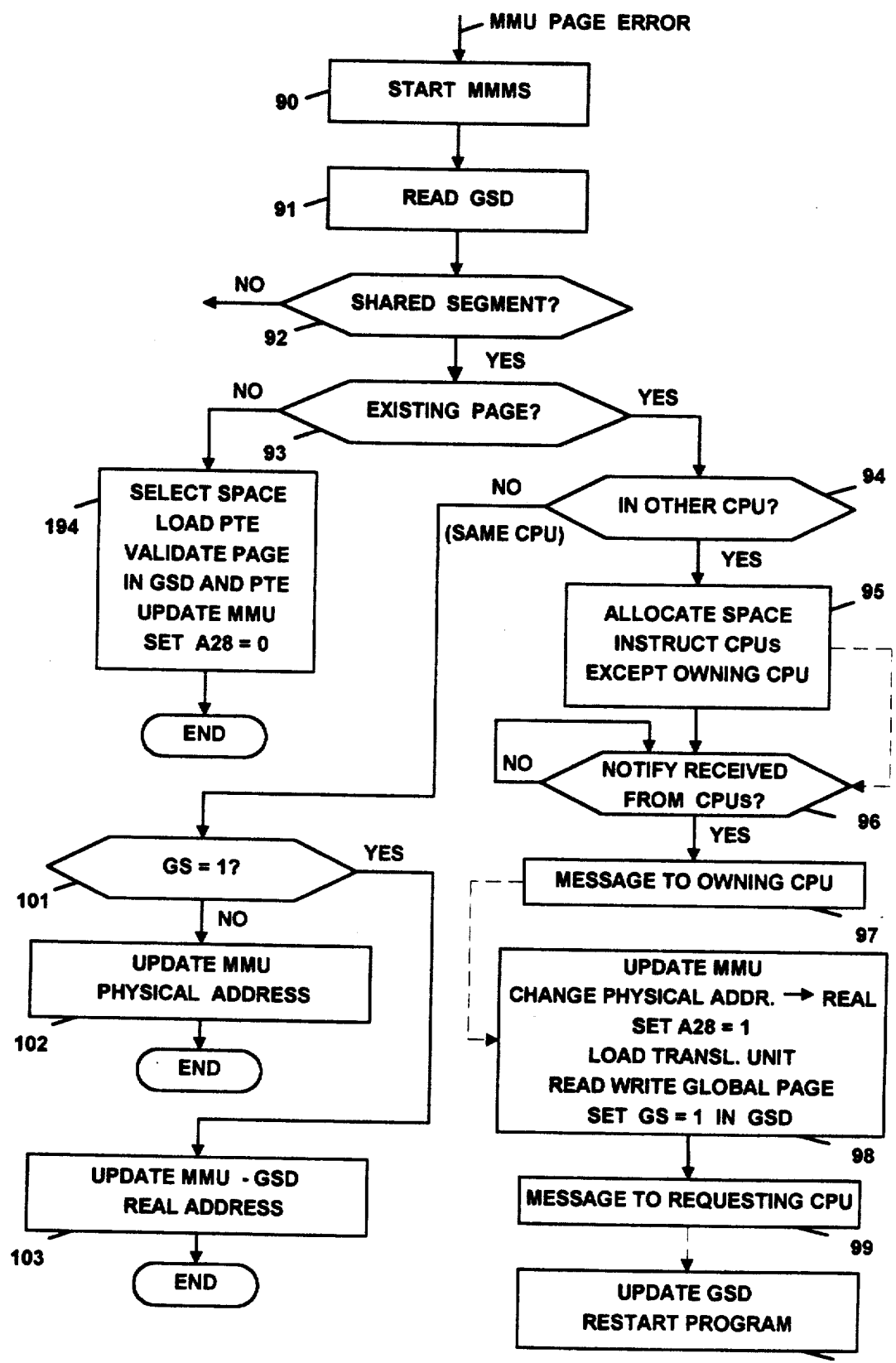
FIG. 12 is a flow diagram showing the process of dynamic global data replication by pages.

With reference to FIG. 12, it is now considered how the page fault mechanism, therefore the Main Memory Management System MMMS, operates to allocate physical pages in case of shared pages. The first time a program active in a CPU (i.e., CPU0) seeks to have access by a virtual address to a shared segment page which is certainly proceeded by execution of the primitives shm-get and shm-at which generate the tables REGION, R-LIST and PTE in the local memory of all CPUs, the related MMU generates a page error signal. Therefore, the memory management system MMMS is activated (step 90). By means of the already described tables, in particular GSD table, it can be detected that the page is for a shared segment (steps 91, 92) and it does not exist in any one of the local memories (i.e., bits S0, S1, S2 and S3 invalid in GSD table) (step 93). The MMMS system then selects a free memory page and loads the related physical address in the PTE table (step 194). It further validates the page status both in PTE table and in GSD table by setting to 1, the related status bit S0. Eventually, the contents of MMU are updated with the related virtual address/physical address. In this case, since the page is valid in one CPU only (i.e., CPU0), it is treated as local information and the related physical address is written in the MMU. Bit 28 which characterizes the information as global or local, is set to 0. Any subsequent access operation to the same page by the same program occurs without activation of the page fault mechanism.

If another program, active in the same CPU, attempts to have access to the same page (in compliance with access limitations, for instance read only), the access occurs normally without activation of the page fault mechanism unless a different virtual address (i.e., synonym) is used for the same information. In this case, the page fault mechanism is again activated and once ascertained that the page already exists in the same CPU (step 94) after having checked that the page is not yet global (step 101), is referenced by the physical address stored in the PTE table, the MMU entries are updated to provide the new relation virtual address synonym/-physical address (step 102). Should it be detected that the page has already become global, the MMU would be loaded with the real address instead of the physical one (step 103). Now, if a program active in a CPU other than the previously considered one, CPU0, seeks to access the same page of shared segment, the MMU related to said other CPU generates a page error signal.

Therefore in this CPU, hereinafter referred to as requesting CPU, the MMMS system is activated and through the already considered tables, it may ascertain (step 93) that the page is already present in the local memory of another CPU (i.e., CPU0 which for the following is referenced as owning CPU). The requesting CPU (step 94) then requests that the page be converted from local to global hence be replicated in all local memories. To this purpose, the requesting CPU gives instructions to all other CPUs and to itself, but not to the owning CPU, so that each one allocates a physical free page (step 95). A predetermined real address, selected among those already booked and present in the GSD table, is assigned to each allocated page. Each CPU other than the owning CPU, by means of its own MMMS system, finds a free physical page within the local memory and loads the corresponding physical address in the translation memory 8B coupled to its own local memory, at the translation memory entry defined by the assigned real address. The physical address is also written in the PTE table. The status of this page, in the tables which reference it (i.e., PTE, GSD), is set invalid, to prevent its use.

Once these operations are performed, each CPU other than the owning CPU, provides to notify the requesting CPU that the operations have been completed. Once confirmation is received that a physical page has been reserved for a global write, (step 96) and the requesting CPU sends a message to the owning CPU and requests that the requested page be moved to the global space (step 97). Then the owning CPU performs the following operations (step 98):

updates the MMU tables by exchanging the physical address with the corresponding real one, in which bit 28 is set to 1 and characterizes the page as global;
loads the physical address obtained from its own PTE table in its own translation unit 8B, at the entry referenced by the real address of the page;
performs a sequence of read and write operations so as to locally copy the full page; by the write operation, (i.e., global data write) a replication is performed in the local memory of the other CPUs; and
updates the GSD table by setting to one, the bit GS related to the page.

Once these operations are performed, the owning CPU sends a message to the requesting CPU (step 99) and notifies that the page which has been replicated, may be validated and the user process may be restarted. The requesting CPU, once this message is received, updates the status bit related to its own local memory in the GSD table, validates the page in its own local memory and restarts the program which requested the page (step 100). The CPUs other than the owning and requesting one, do not update the related status bit in the GSD table and leave invalid, the page which is replicated in their local memory even if present.

Once the page is made global, any data modification within the global page performed by the owning CPU or the requesting CPU, is performed and replicated in all local memories. If a third CPU requires access to the same shared page for a generic process, obviously after connection of the shared segment by the shm-at primitive, the page fault mechanism detects through the GSD table that the page is global (steps 91 to 94 and 101, 103). Therefore, it simply validates it by setting to 1, the status bit related to the page and the new CPU in the GSD table. If another process in the third CPU requests access to the same page (i.e., with the same virtual address), access is obtained without activation of the page fault mechanism.

Figure 13:
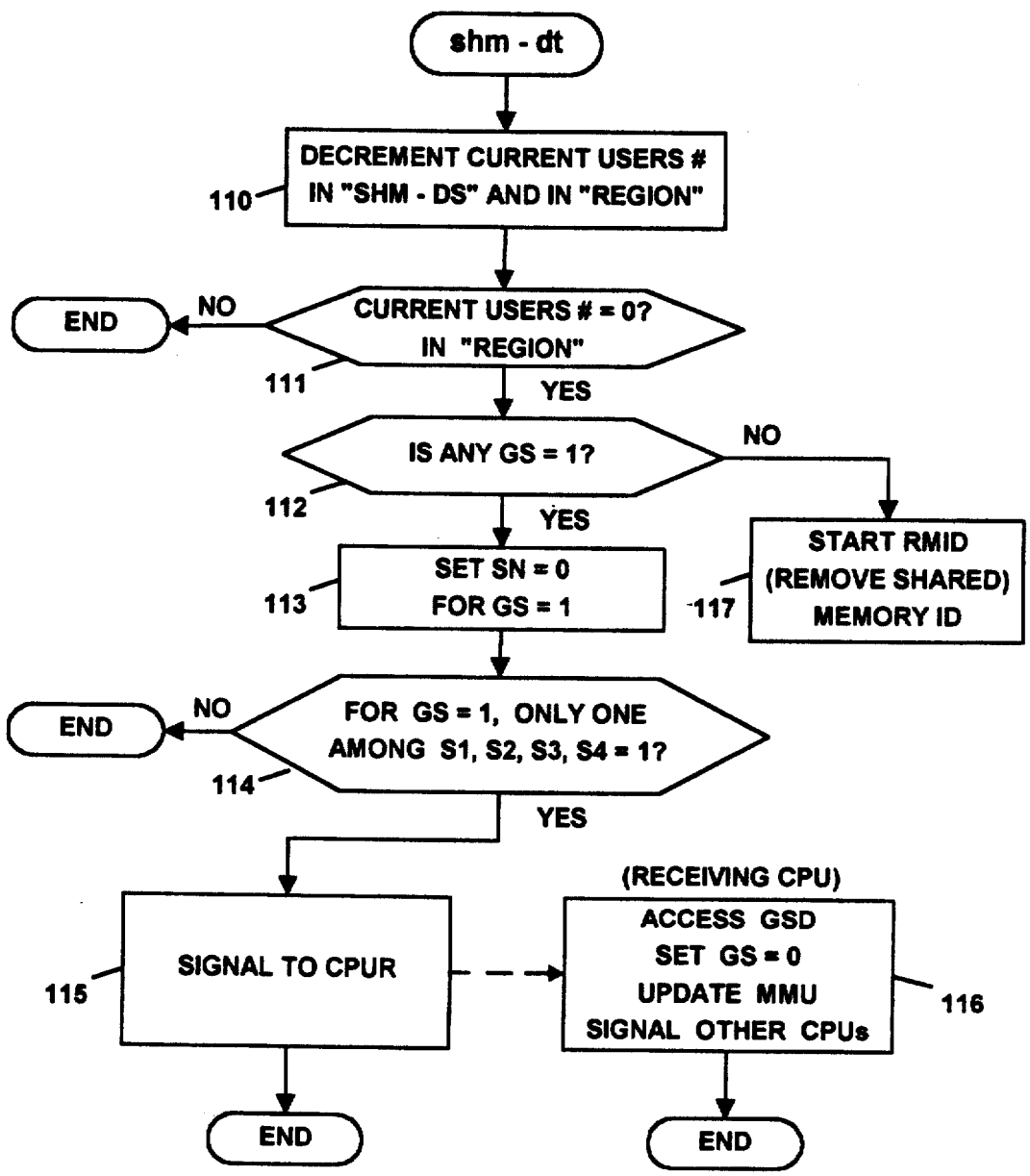
FIG. 13 is a flow diagram showing the process of dynamic data pages conversion from global to local.

It may be noted that a shared or global segment, in the course of its use by a plurality of processors, consists in a plurality of physical pages, some of which are global, hence, replicated in the local memory of the CPUs which have requested them, others of which are local and present in only one of the local memories, not necessarily the same local memory for all the local pages. The situation is depicted by way of example in FIG. 6 which shows the status of GSD table compiled to describe the status of a virtual segment comprising pages defined by real addresses 1, 2, 3, 4 and 5. The pages having real addresses 1, 2 and 3 are global (GS=1), replicated in the local memory of CPU 0, 1, 2 and 3 and used, hence valid, by one or more processes active in CPU 1, 2 and 3, in CPU 0, 1 and 2 and CPU 0 and 1, respectively. The page having real address 4 is local and present only in the local memory of CPU2 (GS=0, S2=1). The page having real address 5 is local and present only in the local memory of CPU0 (GS=0, S0=1). In this way, the pages of real address 4 and 5 are treated as local, need physical memory space in one local memory only and their modification by write operation does not require system bus access operation. Having shown that a page of a shared segment may be converted from local page to global page, dynamically, that is, at "run time," conversion from global to local may be considered as performing the opposite operation which will be described with reference to FIG. 13.

In the operating systems, there are two commands which enable it to exit from or end a process or to disconnect a segment from a process. They are the exit and detach commands. The first one is implicit that at the end of a process, the operating system causes the exit from the process. The second is an explicit command which controls the disconnection of a segment. In particular, in those operating systems where a shared segment is provided, there is a specific command shm-dt which controls the disconnection of a shared segment. When in a generic CPUN, a process ends, the command shm-dt decrements by one, the number of users stored in the structure SHM-DS and in the REGION table related to CPUN (step 110) and tests if in the REGION table, the users number has become zero (step 111). If there still are users, the GSD table is not modified. If, for CPUN, the number of users is zero, the GSD table is updated by setting to 0, the status bit SN related to CPUN for all those pages of the segment which are global (GS=1) (steps 112, 113). The pages which were local are kept valid even if no longer used by CPUN, because they are pages of a shared segment and potentially, they may be requested by other processes in other CPUs. For the global pages which are invalidated, the related physical address/real address in the translation memory 8B is left unchanged, as well as the status of the page in table PTE. As a consequence, the invalidated pages continue to be present in the local memory and continue to be updated if global write operations are caused to occur by other processors.

It is further tested if due to such updating the pages which were global remain valid, all of them or some of them only, in one CPU only, named receiving CPU (step 114). If this condition is not met, the pages continue to be treated as global. If this condition is met for at least one page, the CPUN signals to the receiving CPU that this second one is the last to use one or more pages of the shared segment and that such pages have to be converted into local pages (step 115). Therefore, the receiving CPU gets access in turn to the GSD table to change bit GS (i.e., global page indicator) from a "1" to a "0" for all pages which remain of exclusive use by the receiving CPU (step 116). It further replaces the real address with the related physical address in the MMU for the pages converted to local. The physical address is obtained from the translation memory 8B coupled to the local memory related to the receiving CPU. It further signals to the other CPUs that the physical pages allocated to that or to those global pages may be free (step 116).

In this way, some or even all the pages of the shared segment, previously global and replicated, cease to be treated as such and return to be treated and addressed as local to one CPU even if shared by a plurality of processes within the same CPU. When in the last CPU using pages of the shared segment, the last process using the shared segment ends, the segment consists of local pages only even if they may be distributed in several CPUs. Liberation of these local pages and the disconnection of the shared segment are performed with an explicit disconnection request RMID (Remove shared memory identifier) (step 117). This means that all the global and local data structures which have been created to describe the shared segment (i.e., SHM-DS, REGION, R-LIST, PTE, GSD) and related pointers are cancelled after having previously saved the contents of the segment in a swap area, if so required.

To better show the advantages of the invention and the way in which a shared segment changes from a state of global pages to a state of local pages, FIGS. 7, 8 and 9 provide an example. Departing from the state shown in FIG. 6, which shows the situation at a time T0, it may be assumed that at a subsequent time T1, the last process ends which uses the segment in the CPU0. Thus, bit S0 related to the pages having real addresses 2 and 3 is set to 0 (FIG. 7) and the related memory space in CPU0 becomes free (usable for other purposes). The page having real address 5 was already local. Therefore, the related bit S0 is left valid and the page remains available.

The page having real address 3 was global but used in CPU0 and CPU1 only. Therefore, it becomes a local page of CPU1 (i.e., bit GS is set to 0) and the related memory space becomes available in all CPUs except CPU1 for other purposes. The page having real address 2 which was used by CPU0, CPU1 and CPU2 was global and remains global. The physical memory space used by this page in CPU0 continues to be used for allocation of the page and is not available. At a time T2, subsequent to T1 in FIG. 8, the processes active in CPU1 and using the segment end. Then, even page 2 which was global, is converted to local. At a time T3 subsequent to T2 in FIG. 9, the processes active in CPU2 and using the segment have ended. Page 1 which was global, is converted to local and it is the only one still in use. Most of the physical memory space previously used to store the several concurrently used pages of the segment, is available. This is before the shared segment ceases to be used, that is, before a time T4 at which the processes using the segment in CPU3 end and the segment may be disconnected and removed from memory. Most of the pages even if used in different CPUs are replicated or treated as local without incurring the overhead resulting from their handling as global.

From the previous description, it appears that all the operations of dynamic allocation and deallocation of global data are performed in the several CPUs by the processors contained therein suitably controlled by instruction streams, constitute logical means which together with memory tables and among them table GSD, and by examination of their contents, control the execution of the several described phases. It is further clear that the preceding description relates to a preferred embodiment of system and method in accordance with the invention and that several changes can be made. In particular, the use of translation memories to remove the constraint of allocating global data pages at physical pages having the same physical address in the several local memory even if preferable and providing several advantages, is not necessary. In this case, the advantage of memory space saving in the allocation of global data is lost. However, the advantages resulting from reduction of the bus traffic for replicated write operations are maintained. Even the functions performed by the several primitives in the generation and modification of the tables which describe the several processes and in the generation of the messages among the several CPUs may be assigned in a different way as a function of operating system constraints and derogations to compatibility (with conventional operating systems) of the operating system incorporating the modifications required by the invention. For example, the conversion of a page from local to global by its replication may be performed by the requesting CPU rather than the owning CPU and by means of direct memory access (DMA) circuits rather than by the CPU processor.

What is claimed is:

1. A multiprocessor system which performs the method of dynamically allocating and replicating global data, said system having distributed shared resources and dynamic global data replication comprising a system bus, a plurality of central processing units (CPU) operating under control of a UNIX type operating system, each CPU comprising a processor, a related local memory connected to said processor, a related memory management unit (MMU) connected to said processor for converting virtual addresses received from said processor into addresses having a bit field which identifies said addresses as related to global data used in more CPUs of said plurality and which read replication in the local memory of each CPU in said plurality, or as related to local data used by one only of said CPUs and an interface unit connected to said system bus and enabling information exchange among said CPUs through said system bus, said method comprising the steps of:

generating a memory table (GSD) in the local memory of each of said CPUs under control of said operating system for referencing by codes related to virtual page addresses of shared segments, said memory table storing information which, for each virtual page address, defines if the data in said virtual page are global data or local data and in which of said CPUs said global data are used and validity stored in the related local memory;

at least one CPU of said plurality of CPUs performing a page fault procedure in response to an indication of missing page generated by the related MMU which references said GSD table in the local memory related to said one CPU upon detecting that said missing page is used in another CPU of said plurality of CPUs and stored in the local memory of said another CPU as local data page, for generating signals for requesting all other CPUs to allocate a free physical memory page of the related local memory for storing a global data page and for causing said page missing in said one CPU and stored in the local memory of said another CPU to be replicated in the local memories of all other of said CPUs; and, changing the information stored in said GSD table by said one CPU to indicate that said page requested to be replicated is global upon completion of said page being replicated in the local memories of all other of said CPUs.

2. The method of claim 1 further comprising the steps of:

detecting at the end of a process executed in said further CPU by said further CPU when a global data page is no longer being used in said further CPU but is still in use in at least two other CPUs and modifying information stored in said GSD table by said one CPU to indicate that said page which is no longer used in said further CPU is invalid in said further CPU.

3. The method of claim 1 further comprising the steps of:

detecting at the end of a process executed in said further CPU by said further CPU when a global data page is no longer being used in said further CPU and is still used in only one CPU among said CPUs, and causing a modification of information stored in said GSD table by said one CPU upon detecting that said global data page is no longer being used in said further CPU to indicate that said page used in said one CPU, is a local data page which does not need replication in the local memories of said CPUs other than said one CPU.

4. The method of claim 1 wherein said GSD table stores for each virtual page address of a page defined as global data page by said GSD table, a page address code, named real page address and, each of said CPUs further including translation means for translating said real page address into physical page addresses with criteria autonomous for each of said CPUs, and wherein said MMU in each of said CPUs when referencing data in pages designated as global by said GSD table generates an address having a first field consisting of said real page address and said bit field identifying said address as related to a global data.

5. In a multiprocessor system having distributed shared resources and comprising a system bus, a plurality of central processing units (CPU), each CPU comprising a processor and a logical memory, a memory management unit (MMU) and an interface unit connected to said system bus for enabling information exchange among said CPUs through said system bus, a method for dynamically allocating and replicating global data comprising the steps of:

(a) generating by any one of said plurality of CPUs for each shared data segment, a table GSD which for each page of said shared segment contains information indicating if the page is global or used by processes active in more than one of said CPUs, or local or used by one or more processes active in only one of said CPUs, information further indicating in which of said CPUs said page is used and in which of CPU local memories said page is stored;

(b) detecting by one CPU by means of said GSD table, if a shared data page needed by a process active in one CPU of said plurality of CPUs is being used in another process created in another CPU of said plurality of CPUs, and stored in the local memory of said another CPU;

(c) requesting by said one CPU to all said CPUs other than said another CPU when the result in step (b) is affirmative, to allocate a physical memory page of the related local memory for storing a global data page;

(d) replicating by said another CPU, said page needed by said process active in said one CPU, and stored in the local memory of said another CPU, in the local memory of all said CPUs; and, (e) changing by a CPU of said plurality of CPUs, the information stored in said GSD table to indicate that said page replicated in step (d) is global.

6. The method of claim 5 further comprising the steps of:

(f) detecting by a further CPU of said plurality of CPUs at the end of a process executed in said further CPU of said plurality of CPUs if a global data page previously used in said process is no longer needed in said further CPU but is still in use in at least two of said CPUs; and, (g) upon detecting an affirmative result in step (f), changing the information stored in said GSD table to indicate that said page which is no longer needed in said further CPU is invalid in said further CPU.

7. The method of claim 6 further comprising the steps of:

(h) detecting by said further CPU at the end of a process executed in said further CPU of said plurality of CPUs if a global data page previously used in said process is no longer needed in said further CPU but is still used in only one CPU of said plurality of CPUs; and, (i) upon detecting an affirmative response in step (h) and that said further CPU having changed the information stored in said GSD table to indicate that said page which is no longer needed in said further CPU is invalid in said further CPU, said only one CPU further changing the information stored in said GSD table to indicate that said page no longer needed in said further CPU, is local only to said one CPU.

* * * * *